UNITED STATES PATENT OFFICE.

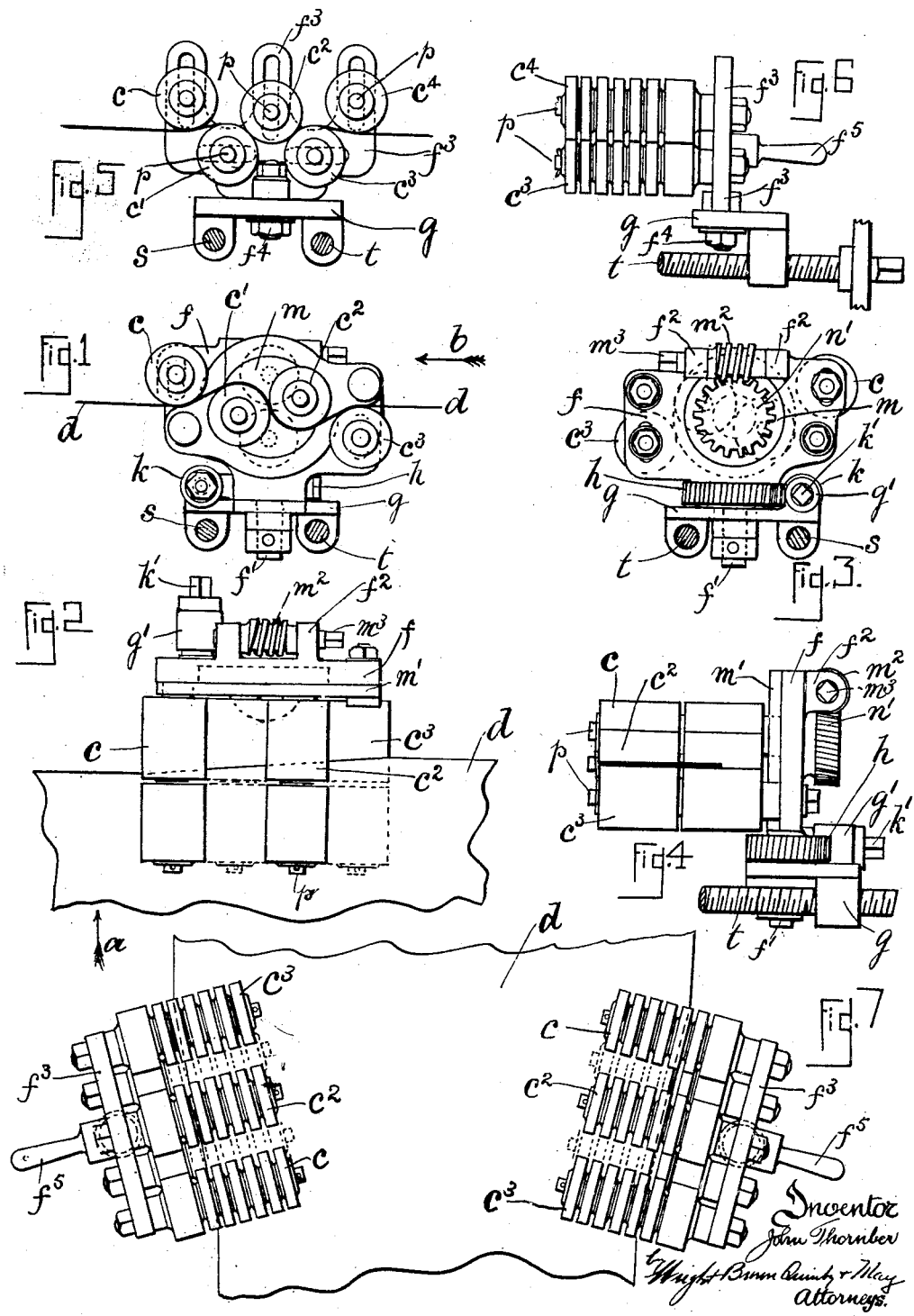

JOHN THORNBER, OF BRADFORD, ENGLAND, ASSIGNOR TO BRADFORD DYERS ASSOCIATION LIMITED, OF BRADFORD, ENGLAND.

APPARATUS FOR STRETCHING FABRICS.

1,376,736.  Specification of Letters Patent.  Patented May 3, 1921.

Application filed March 25, 1919. Serial No. 285,015.

*To all whom it may concern:*

Be it known that I, JOHN THORNBER, a subject of the King of Great Britain, and resident of 281 Kensington street, Bradford, in the county of York, England, have invented certain new and useful Improvements in Apparatus for Stretching Fabrics, of which the following description, by reference to the accompanying sheet of drawings, is a specification.

In the bleaching, dyeing, finishing and other treatments to which fabrics have to be subjected, it is necessary that said fabrics should be stretched and guided in a straight condition when being fed to said apparatus or mechanism, in order that all creasing of any part as well as the turning over of the selvages known as "listing" are avoided. To provide means whereby the stretching and guiding of fabrics under the conditions stated may be readily effected by apparatus that may be applied in varied positions upon or at such parts of said machines as may be found necessary, is the object of my present invention.

In the accompanying sheet of drawings apparatus is shown constructed in accordance with my invention the same being mounted upon a guiding bar and a screw arranged to extend from one frame side to the other of any machine or apparatus to which same may be applied.

In said drawings:—

Figure 1 is an elevation of apparatus made in accordance with my invention, the same being shown as seen in the direction indicated by arrow $a$ of Fig. 2.

Fig. 2 is a plan of the parts shown by Fig. 1.

Fig. 3 is an elevation of the parts shown by Figs. 1 and 2 as seen in the opposite direction to that in which the parts shown by Fig. 1 are seen.

Fig. 4 is an elevation of the parts shown by Figs. 1, 2 and 3 as seen in the direction indicated by arrow $b$, Fig. 1.

Figs. 5 and 6 are similar views to Figs. 1 and 4 respectively and illustrate a simpler form of the mechanism constructed in accordance with my invention.

Fig. 7 is a plan of two sets of my apparatus shown by Figs. 5 and 6, one set of said apparatus being mounted on one side of a piece of fabric while the other set is mounted on the other side of same in such positions as to cause said fabric to be stretched on passing between the rollers of said apparatus.

To attain the object of my invention I make use of a pair of brackets $g$ which I mount to slide over a fixed shaft $s$ and a screw $t$ which are arranged to reach from the framework on one side to the framework on the other side of any machine to which my apparatus has to be applied. The shaft $s$ has its outer ends fixed to said framework while the screw $t$ (which has half of its thread leading in one direction and the other half in the other direction) is mounted to rotate upon said framework so that by being revolved by the attendant said screw threads may move one bracket in one direction and the other in the other direction to adjust them at the edges of the fabric they have to guide and at a distance apart from each other to meet the requirements of the width of the fabric, the arrangement and use of this guiding shaft and operating screw being well known in this type of machinery.

On each of these brackets $g$ I mount bearings $f$ which are arranged to support a plurality of rollers $c$—$c^4$, a series of four being shown by Figs. 1 to 4 while a series of five is shown by Figs. 5 to 7. These rollers are preferably covered with rubber or some such substance. In certain instances leather may be employed for this purpose. Again said rollers may be comparatively long as shown by Figs. 2 and 4 or they may be in the form of series of disks as shown by Figs. 6 and 7.

The mounting of these rollers in bearings $f$ is such that the path between them for the passage of the fabric $d$ may be arranged to be more or less zigzag or sinuous in accordance with the degree of grip that it is desired that said rollers should exercise or exert over said fabric as circumstances demand.

Upon the bracket $g$ are mounted the bearings $f$ upon which are fixed the spindles $p$ on which the rollers $c$ are mounted to rotate. The bearings $f$ are arranged so that they may be adjusted radially upon the bracket $g$ by swiveling about their axial pin $f^1$. To the lower part of the bearing $f$ is fixed or secured a toothed quadrant $h$, the teeth of which are formed to receive the thread of a worm $k$. This worm $k$ is mounted to rotate in bearing $g^1$ formed on the bracket $g$ so that the attendant by placing a key over the square part $k^1$ of the shaft upon which the worm $k$ is mounted, may rotate the worm $k$ and thereby operate the quadrant $h$ to adjust the bearing $f$ in any position radiating from the center of the shaft or pivot $f^1$ upon which said bearings are mounted.

The rollers $c$ and $c^3$ may be adjusted as desired by their spindles $p$ being fixed at a higher or lower position in vertical slots made in the bearings $f$.

The rollers $c^1$ and $c^2$ as illustrated by Figs. 1, 2 and 4 have their spindles $p$ fixed upon a disk $m$ which disk $m$ is arranged to take into a circular opening made in the beraings $f$ there to be retained by a detachable plate $m^1$ which secures it in said bearings and yet permits it to rotate; thus the rotary motions of the disk $m$ will carry the two rollers $c^1$ and $c^2$ into any position around the axis about which it revolves.

Fixed to the rear of the disk $m$ is a worm wheel $n^1$ and gearing with this worm wheel is a worm $m^2$ which is carried by bearings $f^2$ forming part of the bearing $f$. The worm $m^2$ may be rotated by the attendant using the same key that he uses for operating the worm $k$ by same being arranged to take over the square spindle $k^1$ as it takes over the square part $m^3$ of the spindle upon which the worm $m^2$ is fixed.

The attendant by rotating the worm $m^2$ may revolve the disk $m$ and adjust the rollers $c^1$ and $c^2$ in any position desired; hence he may alter the sinuosity of the path through which the fabric $d$ has to travel by rotating said worm $m^2$. As for example when the worm $m^2$ is rotated to adjust the rollers $c^1$ and $c^2$ in the position shown in broken lines of Fig. 1, the passage of the fabric $d$ between said rollers will be approximately straight and will not be acted upon to any great extent by any of said rollers, whereas when the worm $m^2$ is rotated to adjust the rollers $c^1$, $c^2$ in a position somewhat as shown by full lines Fig. 1 then the sinuosity of the path for the fabric $d$ is greatly increased. This sinuosity, as will be observed, may be still further increased by rotating the worm $m^2$ so as to cause the rollers $c^1$ and $c^2$ still to move around the axis of the disk $m$.

The apparatus herein described is mounted on each side of the machine (as previously stated) so that the series of rollers may engage with the two outer edges of the fabric $d$ which is being stretched by them and fed to other apparatus for treatment. Provided the fabric is not required to be greatly stretched but is required simply to be guided in a straight path through or between the rollers $c$—$c^3$ then the axes of said rollers $c$—$c^3$ are nearly at right angles to the path in which the fabric $d$ has to travel. On the other hand provided the fabric $d$ has to be stretched to a greater extent then the rollers $c$—$c^3$ on one side are arranged to be at an acute angle to the path through which the fabric $d$ has to pass while the other series of rollers at the other side of the fabric are arranged at a similar angle but in the opposite direction as shown by Fig. 7, thus the fabric on entering its path between the rollers causes said rollers to revolve and by their revolutions around their respective axes their dragging effects the stretching of the fabric to cause same to travel as desired. The adjustment as to the angularity of the axes of the rollers relative to the direction in which the fabric $d$ travels is effected by the actions of the worm $k$ over the toothed quadrant $h$ as hereinbefore explained.

Provided simpler devices are required as for example when said devices are to act (after once being adjusted) upon the same class of material for a period which is long enough not to seriously affect the output of work by stopping the apparatus to enable any readjustment by the rollers, then the series of rollers $c^1$ to $c^4$ respectively may be made use of as illustrated by Figs. 5, 6 and 7; these rollers may be mounted so that the sinuosity between them may be regulated by moving said rollers $c$, $c^2$ and $c^4$ in vertical slots formed in the bearings $f^3$ or by moving the rollers $c^1$ and $c^3$ in the horizontal slots in said bearings $f^3$. The angularity of the bearings $f^3$ may be altered by the attendant loosening the fixing nut $f^4$ and adjusting the bearings $f^3$ on the bracket $g$ by the handle $f^5$ on the effecting of which adjustment he may again firmly fix said bearings to the bracket $g$ by the nut $f^4$ thus avoiding the employment of the more complicated parts with worm adjustments hereinbefore described.

Such being the nature and object of my said invention, what I claim is:—

1. In apparatus for stretching and guiding fabrics, a plurality of rollers with prepared surfaces as described, spindles for said rollers, a bracket having slots for the reception of said spindles so that said spindles may be adjusted in varied vertical and horizontal positions therein, a support for said bracket with slots to allow adjustment about a given center in the horizontal plane, means for securing said bracket upon said support when once adjusted, an operating screw with left and right hand threads for actuating the supports for the bracket, and means for rotating said screw.

2. In apparatus for stretching and guiding fabrics, a plurality of rollers, spindles for said rollers, a rotary disk for the reception of two of said spindles, a bracket upon which said rotary disk is mounted, said bracket having slots to receive two of the spindles, a support for said bracket, a pivotal spindle upon said support, a worm wheel upon said support and a worm wheel upon the disk carrying the spindles of the rollers, and worms for operating said worm wheels.

3. In apparatus for stretching and guiding fabrics, a plurality of rollers, spindles for said rollers, a rotary disk for the reception of two of said spindles, a bracket upon which said rotary disk is mounted, said bracket having slots to receive two of the spindles, a support for said bracket, a pivotal spindle upon said support, a worm wheel upon said support and a worm wheel upon the disk carrying the spindles of the rollers, worms for operating said worm wheels, appropriate bearings for supporting said worms, and a screw upon which the said bearings are mounted.

4. In apparatus for stretching and guiding fabrics, a plurality of rollers, spindles upon which said rollers are mounted, a bearing having vertical and horizontal slots within which the spindles carrying the rollers may be mounted, an adjustable support for said bearings, said support and said bearings being constructed to permit said bearings to be adjusted in the horizontal plane and means for securing said bearings upon said supports in their adjusted positions.

JOHN THORNBER.